(12) United States Patent
Zeng et al.

(10) Patent No.: US 10,432,301 B2
(45) Date of Patent: Oct. 1, 2019

(54) HIGH-SPEED OPTICAL TRANSCEIVER FIELD READER

(71) Applicant: Facebook, Inc., Menlo Park, CA (US)

(72) Inventors: WenSheng Zeng, Fremont, CA (US); Abhijit Chakravarty, Fremont, CA (US); Anthony Poblete, Fort Worth, TX (US); Che Kin Leung, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 3 days.

(21) Appl. No.: 15/807,428

(22) Filed: Nov. 8, 2017

(65) Prior Publication Data

US 2019/0140738 A1 May 9, 2019

(51) Int. Cl.
| | |
|---|---|
| *H04B 10/07* | (2013.01) |
| *H04B 10/40* | (2013.01) |
| *H04L 12/10* | (2006.01) |
| *H04B 10/11* | (2013.01) |

(52) U.S. Cl.
CPC ............ *H04B 10/07* (2013.01); *H04B 10/40* (2013.01); *H04B 10/11* (2013.01); *H04L 12/10* (2013.01)

(58) Field of Classification Search
CPC ........ H04B 10/07; H04B 10/40; H04B 10/11; H04L 12/10
See application file for complete search history.

(56) References Cited

U.S. PATENT DOCUMENTS

| | | | | |
|---|---|---|---|---|
| 7,058,310 | B2* | 6/2006 | Aronson | G01M 11/00 398/137 |
| 2002/0092972 | A1* | 7/2002 | Ames | H03F 3/08 250/214 A |
| 2002/0149810 | A1* | 10/2002 | Brown | H04B 10/077 398/9 |
| 2006/0110157 | A1* | 5/2006 | Tritschler | H04B 10/00 398/22 |
| 2006/0147162 | A1* | 7/2006 | Ekkizogloy | H04B 10/40 385/92 |
| 2006/0159460 | A1* | 7/2006 | Stewart | H04B 10/07955 398/135 |
| 2006/0189220 | A1* | 8/2006 | Duval | H04B 17/16 439/760 |
| 2006/0215545 | A1* | 9/2006 | Nelson | H04B 10/0799 370/216 |
| 2006/0269283 | A1* | 11/2006 | Iwadate | H04B 10/0799 398/22 |
| 2007/0201867 | A1* | 8/2007 | DeLew | H04B 10/077 398/38 |
| 2007/0280684 | A1* | 12/2007 | Onoda | H04B 10/03 398/38 |

(Continued)

*Primary Examiner* — Mina M Shalaby
(74) *Attorney, Agent, or Firm* — Van Pelt, Yi & James LLP

(57) ABSTRACT

A device comprises an interface, a transmitter, a receiver, a processor, and a dynamically updating indicator on the device. The interface is configured to connect to an optical network transceiver. The transmitter is configured to send to the optical network transceiver a binary signal generated by the device. The receiver is configured to receive data provided by the optical network transceiver in response to sending the generated binary signal. The processor is configured to analyze the received data and the dynamically updating indicator is configured to indicate a test status of the optical network transceiver.

20 Claims, 5 Drawing Sheets

(56) References Cited

U.S. PATENT DOCUMENTS

| | | | | |
|---|---|---|---|---|
| 2009/0304384 A1* | 12/2009 | Li | .......................... | H04B 10/40 |
| | | | | 398/58 |
| 2009/0324237 A1* | 12/2009 | Pan | ....................... | H04B 10/40 |
| | | | | 398/135 |
| 2011/0191632 A1* | 8/2011 | Miller | ..................... | G06F 11/28 |
| | | | | 714/27 |
| 2014/0153921 A1* | 6/2014 | Fox | ................... | H04B 10/0705 |
| | | | | 398/38 |
| 2014/0270755 A1* | 9/2014 | Schmitz | ............. | H04B 10/0795 |
| | | | | 398/26 |
| 2014/0321285 A1* | 10/2014 | Chew | ...................... | H04L 47/24 |
| | | | | 370/236 |
| 2015/0365177 A1* | 12/2015 | Blumenthal | ........... | H04B 10/40 |
| | | | | 398/9 |
| 2016/0087676 A1* | 3/2016 | Tanaka | .................... | H04B 3/32 |
| | | | | 398/193 |
| 2016/0142136 A1* | 5/2016 | Izumi | .............. | H04B 10/07955 |
| | | | | 398/38 |
| 2018/0041282 A1* | 2/2018 | Chen | ................... | H04B 10/035 |

\* cited by examiner

HIGH-SPEED OPTICAL TRANSCEIVER FIELD READER

BACKGROUND OF THE INVENTION

Large datacenters typically utilize numerous high-speed optical transceivers. These devices will fail on occasion and testing is needed in order to determine whether they are operating properly. In many circumstances, testing is also performed on an optical transceiver to determine whether an error in the network is due to the optical transceiver or another network element. Traditionally, in order to test an optical transceiver, the optical transceiver is removed from a network switch in a data center where it is installed. A traffic generator, spectrum analyzer, and other hardware including cables and connectors are utilized to test each optical transceiver in question. The testing hardware is large and cumbersome. In some instances, due to the size and non-portable nature of the testing hardware, the optical transceivers to be tested must be moved to and tested in a lab separate from the data center where they are installed. Therefore, a need exists for a device that can test the operation of an optical transceiver in the field.

BRIEF DESCRIPTION OF THE DRAWINGS

Various embodiments of the invention are disclosed in the following detailed description and the accompanying drawings.

DETAILED DESCRIPTION

Figure 1:
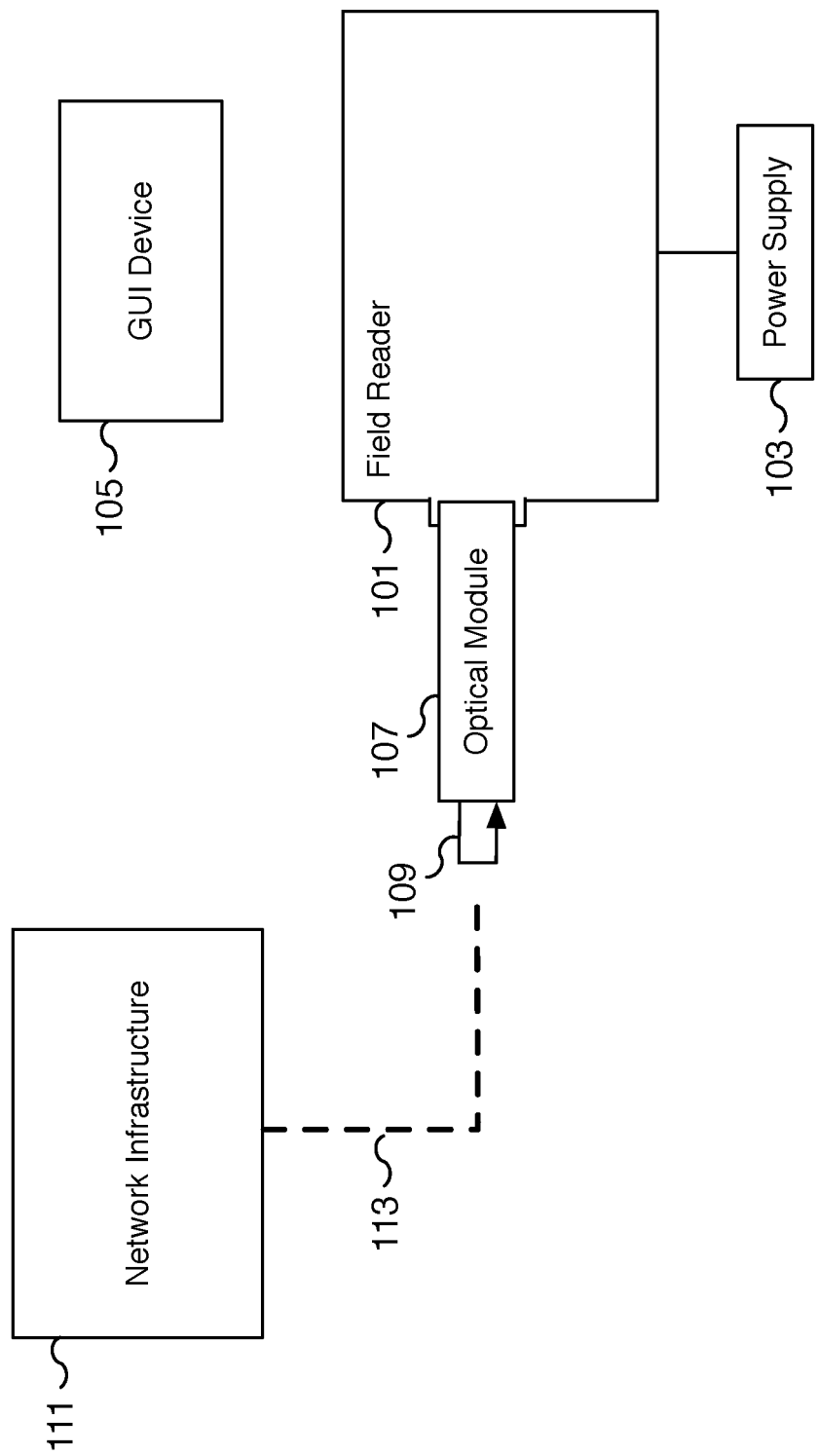
FIG. 1 is a block diagram illustrating an example of a high-speed optical transceiver field reader in a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A high-speed optical transceiver QSFP field reader is disclosed. For example, in a large datacenter, it is common for a network switch to have multiple optical transceivers connected to it. In order to test the operation of an optical transceiver, an optical transceiver is removed from the switch, a loopback device is inserted into the optical transceiver, and the optical transceiver is inserted into a high-speed optical transceiver field reader. In some embodiments, the field reader comprises an interface configured to connect to an optical network transceiver. In various embodiments, the interface utilizes the same format as the network equipment. The field reader further comprises a transmitter and a receiver. The transmitter is configured to send a binary signal to the inserted transceiver. In various embodiments, the field reader utilizes a signal generator to create a binary signal. In response to the binary signal, the inserted transceiver transmits an output stream of data. The receiver of the field reader is configured to receive the output stream of data from the inserted transceiver. A processor of the field reader is configured to analyze the received data. For example, the received data is compared to the transmitted binary signal to determine whether the signal received is within a threshold of accuracy of the signal transmitted. Based on the analysis, the field reader dynamically updates an indicator on the field reader. The indicator indicates a test status of the inserted transceiver. For example, the indicator may be a set of light-emitting diodes (LEDs) that indicate whether the inserted transceiver passed or failed an operational test. In the event the transceiver fails the operational test, the transceiver is a known network point of failure and may be replaced. In the event the transceiver passes the operational test, the network operator may eliminate the transceiver as a potential source of a network error as part of a troubleshooting process.

In some embodiments, a device comprises an interface configured to connect to an optical network transceiver. For example, the portable field reader device includes an interface for connecting to an optical transceiver, such as a four channel pluggable optical transceiver. In some embodiments, the interface is a Quad Small Form-factor Pluggable (QSFP) interface. In some embodiments, the interface is a QSFP+, QSFP28, or other variation of a QSFP interface. In various embodiments, the optical network transceiver is an optical transceiver utilizing a QSFP, QSFP+, QSFP28, or appropriate interface. For example, the optical network transceiver may be a high-speed quad-channel optical transceiver wherein each channel supports one or more transmitting rates. In various embodiments, the transmitting rates may range from 1 gigabit/second up to 28 gigabits/second. In some embodiments, the interface is compatible with transmitting rates reaching a rate of 100 gigabits/second per channel and/or up to 400 gigabits/second total for four channels. In various embodiments, the interface is configured to work with multiple transmitting rates including 28 gigabits/second and up to 100 gigabits/second per channel. The device further comprises a transmitter configured to send to the optical network transceiver a binary signal generated by the device. For example, the device includes a transmitter for sending a binary signal. In some embodiments, the transmitter is connected to a binary signal generator such as a pseudorandom binary sequence (PRBS) generator on the device for transmitting a pseudorandom binary sequence to the optical network transceiver. In some embodiments, the PRBS generator is a quad-channel generator. The device further comprises a receiver configured to receive data provided by the optical network transceiver in response to sending the generated binary signal. For example, the field reader device receives data from the optical network transceiver that corresponds to the signal that the optical network transceiver receives from the device's transmitter. In some embodiments, the field reader device receives data that corresponds to the signal generated from the field reader device's pseudorandom binary sequence once the binary sequence signal passes through the optical transceiver being tested. The device further comprises a processor configured to analyze the received data. For example, the device includes a processor for analyzing the received data and comparing the received data to the transmitted binary signal(s). The device further comprises a dynamically updating indicator on the device, wherein the dynamically updating indicator is configured to indicate a test status of the optical network transceiver. In some embodiments, the device comprises a display, such as a set of light-emitting diodes (LEDs), which are dynamically updated to display the result of the analysis performed by the device's processor. The analysis includes a test status of the optical network transceiver. For example, a green LED may light up to indicate that the optical network transceiver is operational and functioning correctly and a red LED may light up to indicate that the optical network transceiver is non-operational. As another example, the indicator may display a "pass" indicator in the event the optical network transceiver passes a network operation test and a "fail" indicator in the event the optical network transceiver fails the test. In some embodiments, a display includes additional information related to the test status such as power, current, temperature, and optical network transmitter identification information.

FIG. 1 is a block diagram illustrating an example of a high-speed optical transceiver field reader in a network environment. In the example shown, field reader 101 is a high-speed optical transceiver field reader and may utilize an interface such as a QSFP interface. In various embodiments, field reader 101 is a portable field reader that may be utilized by a network operator to test the functionality of an optical transceiver. Field reader 101 is powered by power supply 103. In various embodiments, power supply 103 is a portable power supply. For example, the power supply may be a rechargeable battery. As another example, the power supply may be a mobile device or an AC-DC power supply. In some embodiments, the power supply is sourced from network equipment such as a port on a network switch or using Power over Ethernet (PoE). In some embodiments, the power supply utilizes a standard interface such as a variation of USB. Graphical User Interface (GUI) Device 105 is a device with a graphical user interface for interfacing with field reader 101. In some embodiments, field reader 101 may be optionally controlled using GUI device 105. As an example, GUI device 105 may be a mobile device such as a smartphone that includes a touchscreen for interfacing with field reader 101 and for displaying the analysis performed by field reader 101. In some embodiments, GUI device 105 is a computer such as a laptop computer. In various embodiments, field reader 101 includes a test indictor to display the analysis for field reader 101. In some embodiments, GUI device 105 may be an external device from field reader 101 and may be utilized in addition to or as an alternative to the test indicator on field reader 101 to display additional test indicator results.

In various embodiments, GUI device 105 may be used to configure field reader 101 for different modes of testing. For example, a network operator may use GUI device 105 to configure the information to test and testing parameters to apply to optical module 107. In some embodiments, GUI device 105 may be used to configure the signal generator and/or the error detector of field reader 101. Moreover, GUI device 105 may be used to display the results of the testing. In some embodiments, GUI device 105 may be used to store past test results and/or log past test results on GUI device 105 or a remote data store.

In the example of FIG. 1, optical module 107 is an optical network transceiver that is inserted into field reader 101. In some embodiments, optical module 107 is a QSFP optical transceiver. In some embodiments, optical module 107 is a QSFP+, QSFP28, or similar optical transceiver. Loopback device 109 is inserted into the optical transmitter and receiver ports of optical module 107. In some embodiments, loopback device 109 is a loopback cable or a loopback module for routing the laser signal from the transmitter port of optical module 107 back to the receiver port of optical module 107. In some embodiments, loopback device 109 is attached to field reader 101 such that a loopback device is readily available for insertion into an optical module for testing. In various embodiments, loopback device 109 may be detachable from field reader 101. For example, in some embodiments, loopback device 109 is attached to field reader 101 via a tether that allows for replacing an attachable loopback device in the event the loopback device is damaged.

Prior to utilizing the field reader 101 for testing optical module 107, optical module 107 may be utilized in and installed as a network element of a network infrastructure 111. Network infrastructure 111 may be a network infrastructure that includes a network built out of multiple network switches, routers, servers, and/or other network elements. Typically, optical module 107 is inserted into a port of a network switch of network infrastructure 111 and may be connected optically to other elements of network infrastructure 111 using a fiber optic cable. In various embodiments, when optical module 107 is in an operational mode it is installed in a port of a network switch of network infrastructure 111. In the event an operator desires to test the functionality of optical module 107, the fiber optic cable inserted into optical module 107 is replaced with loopback device 109 and optical module 107 is removed from the network switch and inserted into field reader 101. Dotted line 113 denotes that optical module 107 has been removed from network infrastructure 111 and instead loopback device 109 is installed and optical module 107 is inserted into field reader 101 for testing.

Figure 2:
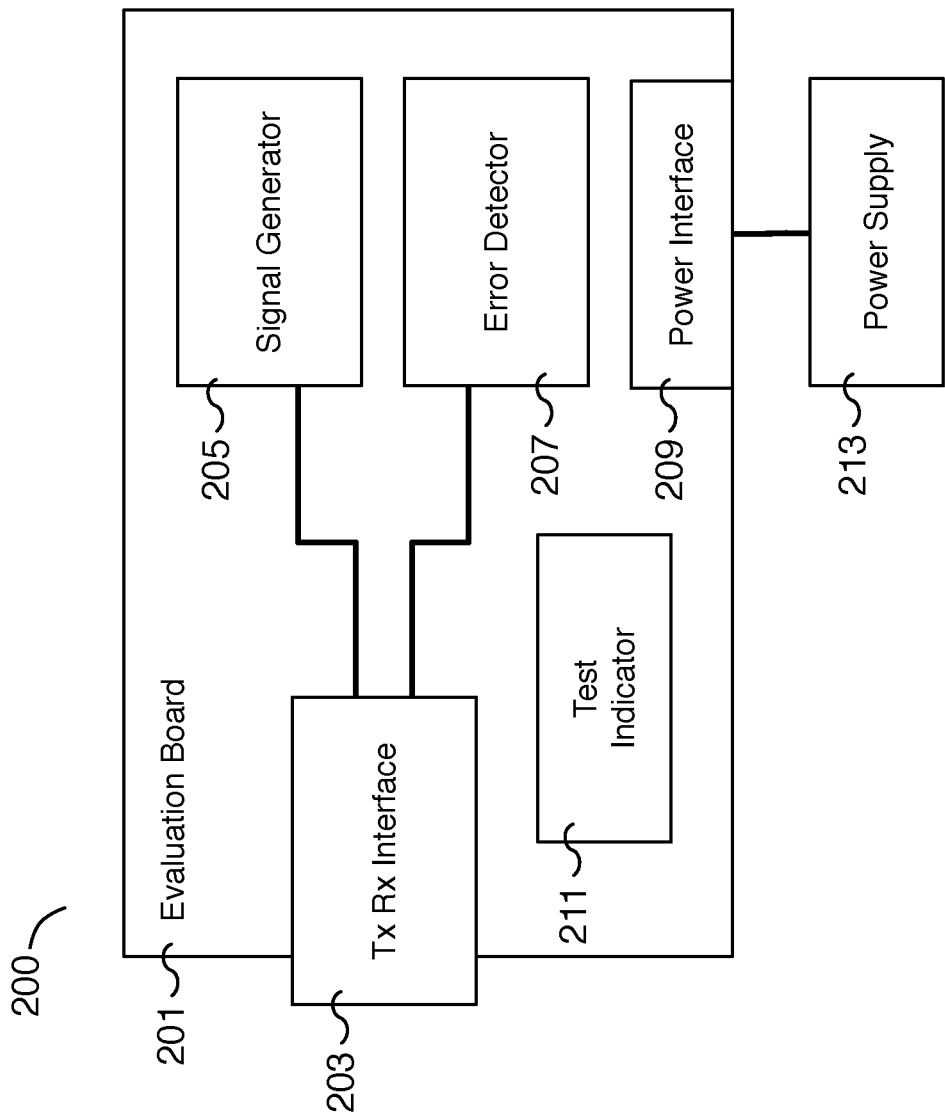
FIG. 2 is a functional diagram illustrating an embodiment of a high-speed optical transceiver field reader for diagnosing an optical network transceiver.

FIG. 2 is a functional diagram illustrating an embodiment of a high-speed optical transceiver field reader for diagnosing an optical network transceiver. High-speed optical transceiver field reader 200, which includes various subsystems as described below, includes evaluation board 201 and power supply 213. Evaluation board 201 is a circuit board that includes subsystems Tx Rx interface 203, signal generator 205, error detector 207, power interface 209, and test indicator 211. In some embodiments, evaluation board 201 further includes and/or is connected to (but not displayed) a network interface, a hardware user interface, and one or more high quality reference clocks. In some embodiments, field reader 200 performs the processes described below with respect to FIGS. 4 and 5.

In some embodiments, field reader 200 is implemented as field reader 101 of FIG. 1 and power supply 213 is implemented as power supply 103 of FIG. 1. In some embodiments, optical module 107 of FIG. 1 is inserted into Tx Rx interface 203. In various embodiments, a network operator may utilize field reader 200 to test an optical module by inserting the optical module, such as an optical transceiver, into field reader 200 for testing.

In the example shown, field reader 200 includes a signal generator 205 for generating a binary signal to Tx Rx interface 203. In some embodiments, signal generator 205 is a multi-channel signal generator, such as a quad-channel signal generator. In some embodiments, the signal generator 205 is a pseudorandom binary sequence (PRBS) generator such as a quad-channel PRBS generator. In some embodiments, the signal generated from a PRBS generator exhibits properties of a random sequence but is generated using a predefined algorithm. In various embodiments, signal generator 205 is utilized to generate a signal that mimics real traffic. Signal generator 205 is communicatively connected to Tx Rx interface 203, which is communicatively connected to error detector 207. In some embodiments, Tx Rx interface 203 is a transmit and receive interface that includes an optical transmitter and an optical receiver compatible with an optical module. The signal from signal generator 205 is sent to Tx Rx interface 203, which transmits the signal to the optical module, such as an optical transceiver, attached to Tx Rx interface 203 using the transmit (Tx) interface. Tx Rx interface 203 further receives data from the receive (Rx) interface of Tx Rx interface 203. In various embodiments, in the event a loopback device, such as loopback device 109 of FIG. 1, is installed in the optical module, the signal transmitted by Tx Rx interface 203 is propagated back to Tx Rx interface 203 by the optical module.

Error detector 207 is an error detector module used to analyze the data received from the receive (Rx) interface of Tx Rx interface 203. In some embodiments, error detector 207 is a multi-channel error detector, such as a quad-channel error detector, capable of analyzing multiple channels in parallel. In some embodiments, error detector 207 is used to determine whether and to what extent errors have been introduced to the signal generated by the signal generator 205 that is transmitted via Tx Rx interface 203 and then received back at Tx Rx interface 203 via an optical module inserted into field reader 200. In some embodiments, error detector 207 utilizes a microprocessor for analyzing the signal error and related test results.

Field reader 200 includes test indicator 211 for displaying the results of the error detection functionality performed by error detector 207. In some embodiments, test indicator 211 is a set of light-emitting diodes (LEDs), such as a green LED and a red LED, that are activated when operational tests on an optical module either pass or fail. For example, a green LED is activated when the optical module passes and a red LED is activated when the optical module fails. In some embodiments, test indicator 211 is a display, such as a light-emitting diode (LED) or organic light-emitting diode (OLED) screen, that displays the operational test result, error analysis, electrically erasable programmable read-only memory (EEPROM) information, or other related test information of the optical module. For example, EEPROM information retrieved from the optical module may be displayed on test indicator 211. As another example, a pass or fail test result may be displayed on test indicator 211. In some embodiments, more detailed error analysis may be displayed on test indicator 211.

In the example shown, power interface 209 is utilized as an interface for receiving power to field reader 200 for enabling the functionality of the field reader components. In some embodiments, power interface 209 may be a standard power interface such as a variation of USB, including mini-USB and USB-C. For example, power interface 209 may utilize a USB interface and be connected to a USB power supply. As another example, power interface 209 may be connected to a laptop or mobile device and field reader 200 may utilize the power supply or battery of the laptop or mobile device to power the operation of field reader 200. As a further example, power interface 209 may utilize power from existing network equipment such as pulling power from one or more ports of a network switch. Field reader 200 may optionally include power supply 213. Power supply 213 may be a portable power supply such as a portable battery power supply or a battery powered mobile device. In some embodiments, power supply 213 utilizes existing network equipment such as one or more network ports of a switch or one or more USB ports of a switch or server. In some embodiments, power supply 213 is an AC/DC convertor or an AC-DC power supply that provides a DC power supply of 3.3V up to 5 W. In some embodiments, the power supply takes as an input an AC supply of 120V or 220V.

In some embodiments, field reader 200 includes a network interface on evaluation board 201 such as a mini-USB port for communicating with an external device. For example, a network interface may be utilized to communicate with a smartphone, a laptop, a desktop computer, a server, or similar computing device by utilizing a USB connection or similar technology. In some embodiments, the external device is GUI device 105 of FIG. 1. In some embodiments, the network interface supports a wireless protocol such as WiFi or Bluetooth. For example, a local wireless protocol such as Bluetooth may be utilized to communicate with a mobile device.

In some embodiments, field reader 200 includes a hardware user interface connected to evaluation board 201. For example, the hardware user interface may include a switch for powering on and off the field reader and buttons for configuring or operating the field reader. In some embodiments, one or more buttons are utilized to configure and/or initiate the testing of an optical module. For example, once an optical module is inserted into field reader 200, a button is pressed to initiate the testing of the optical module. In some embodiments, a set of configuration switches, such as dip switches, are utilized for configuring the field reader.

In some embodiments, evaluation board 201 includes a high quality reference clock. The reference clock may be utilized by error detector 207 and/or signal generator 205 for performing the analysis of an optical module inserted into Tx Rx interface 203 for testing. In some embodiments, the reference clock is utilized for performing eye measurements. In various embodiments, eye measurements are included as part of the testing of an optical module.

Figure 3:
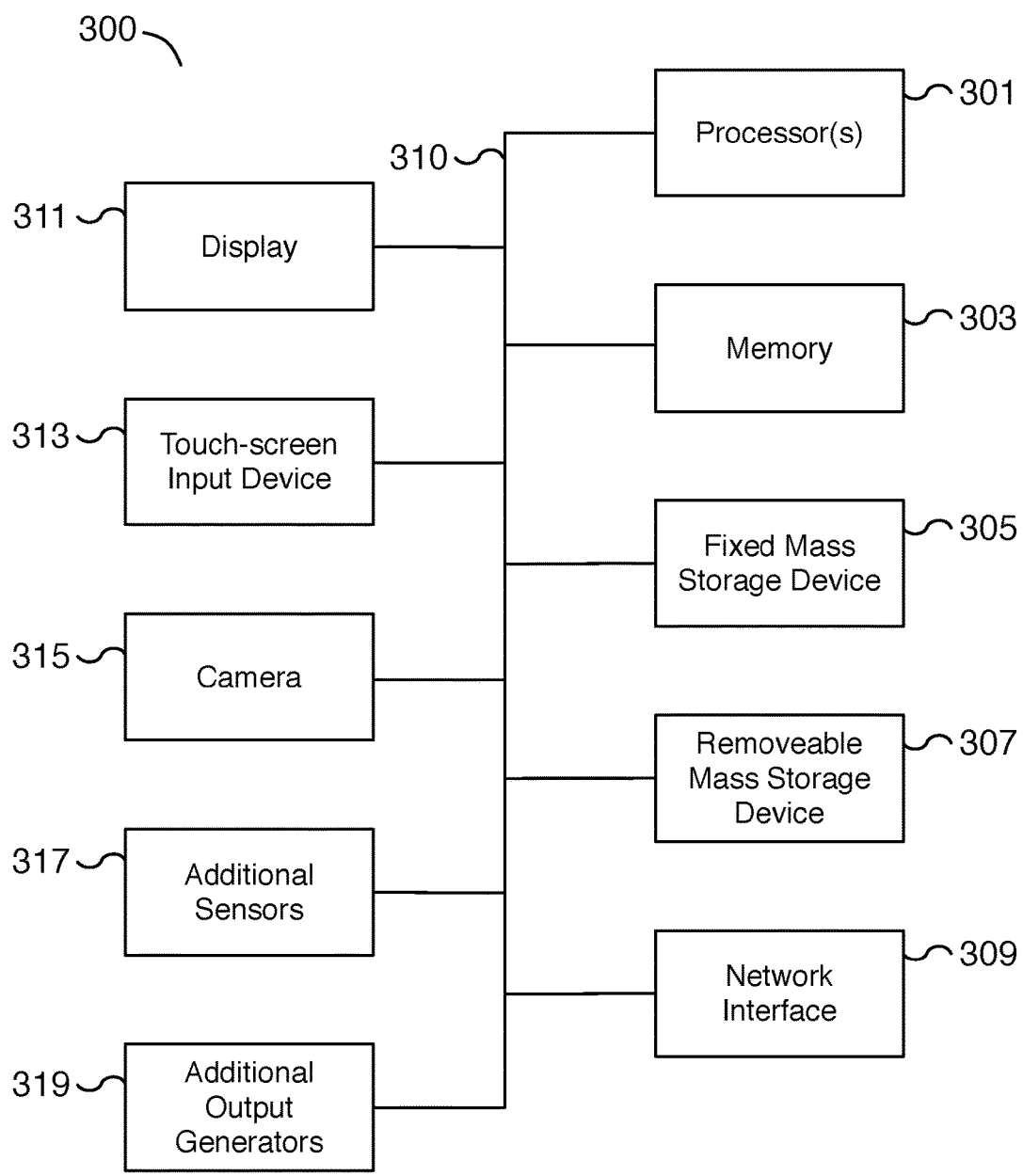
FIG. 3 is a functional diagram illustrating a programmed computer system for interfacing with a high-speed optical transceiver field reader.

FIG. 3 is a functional diagram illustrating a programmed computer system for interfacing with a high-speed optical transceiver field reader. For example, a programmed computer system may be a mobile device, such as a smartphone, for interfacing with a high-speed optical transceiver field reader. In some embodiments, a programmed computer system is a laptop, desktop, or server computer system. As will be apparent, other computer system architectures and configurations can be used to interface with a high-speed optical transceiver field reader. Computer system 300, which includes various subsystems as described below, includes at least one microprocessor subsystem (also referred to as a processor or a central processing unit (CPU)) 301. For example, processor 301 can be implemented by a single-chip processor or by multiple processors. In some embodiments, processor 301 is a general purpose digital processor that controls the operation of the computer system 300. Using instructions retrieved from memory 303, the processor 301 controls the reception and manipulation of input data, and the output and display of data on output devices (e.g., display 311). In some embodiments, processor 301 includes and/or is used to provide functionality for configuring and/or testing the functionality of a high-speed optical transceiver and displaying the testing result(s). In some embodiments, computer system 300 is used to provide GUI device 105 of FIG. 1. In some embodiments, processor 301 is utilized to configure, initiate, and display the results of the processes described below with respect to FIGS. 4 and 5. In some embodiments, computer system 300 is utilized to store and/or log the results of the tests performed by the processes described below with respect to FIGS. 4 and 5.

Processor 301 is coupled bi-directionally with memory 303, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 301. Also as is well known in the art, primary storage typically includes basic operating instructions, program code, data, and objects used by the processor 301 to perform its functions (e.g., programmed instructions). For example, memory 303 can include any suitable computer-readable storage media, described below, depending on whether, for example, data access needs to be bi-directional or uni-directional. For example, processor 301 can also directly and very rapidly retrieve and store frequently needed data in a cache memory (not shown).

A removable mass storage device 307 provides additional data storage capacity for the computer system 300, and is coupled either bi-directionally (read/write) or uni-directionally (read only) to processor 301. For example, removable mass storage device 307 can also include computer-readable media such as flash memory, portable mass storage devices, magnetic tape, PC-CARDS, holographic storage devices, and other storage devices. A fixed mass storage 305 can also, for example, provide additional data storage capacity. Common examples of mass storage 305 include flash memory, a hard disk drive, and an SSD drive. Mass storages 305, 307 generally store additional programming instructions, data, and the like that typically are not in active use by the processor 301. Mass storages 305, 307 may also be used to store user-generated content and digital media for use by computer system 300. It will be appreciated that the information retained within mass storages 305 and 307 can be incorporated, if needed, in standard fashion as part of memory 303 (e.g., RAM) as virtual memory.

In addition to providing processor 301 access to storage subsystems, bus 310 can also be used to provide access to other subsystems and devices. As shown, these can include a network interface 309, a display 311, a touch-screen input device 313, a camera 315, additional sensors 317, additional output generators 319, as well as an auxiliary input/output device interface, a sound card, speakers, additional pointing devices, and other subsystems as needed. For example, an additional pointing device can be a mouse, stylus, track ball, or tablet, and is useful for interacting with a graphical user interface. In the example shown, display 311 and touch-screen input device 313 may be utilized for displaying a graphical user interface for configuring, performing, and displaying the results of a field test on an optical module.

The network interface 309 allows processor 301 to be coupled to another computer, computer network, telecommunications network, or network device using one or more network connections as shown. For example, through the network interface 309, the processor 301 can connect to and receive information from field reader 101 of FIG. 1. Further, through the network interface 309, the processor 301 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 301 can be used to connect the computer system 300 to an external network and transfer data according to standard protocols. For example, various process embodiments disclosed herein can be executed on processor 301, or can be performed across a network such as the Internet, intranet networks, or local area networks, in conjunction with a remote processor that shares a portion of the processing. In some embodiments, network interface 309 utilizes wireless technology for connecting to networked devices such as field reader 101 of FIG. 1. In some embodiments, network interface 309 utilizes a wireless protocol designed for short distances with low-power requirements. In some embodiments, network interface 309 utilizes a version of the Bluetooth protocol. Additional mass storage devices (not shown) can also be connected to processor 301 through network interface 309.

An auxiliary I/O device interface (not shown) can be used in conjunction with computer system 300. The auxiliary I/O device interface can include general and customized interfaces that allow the processor 301 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above and magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 3 is but an example of a computer system suitable for use with the various embodiments disclosed herein. Other computer systems suitable for such use can include additional or fewer subsystems. In addition, bus 310 is illustrative of any interconnection scheme serving to link the subsystems. Other computer architectures having different configurations of subsystems can also be utilized.

Figure 4:
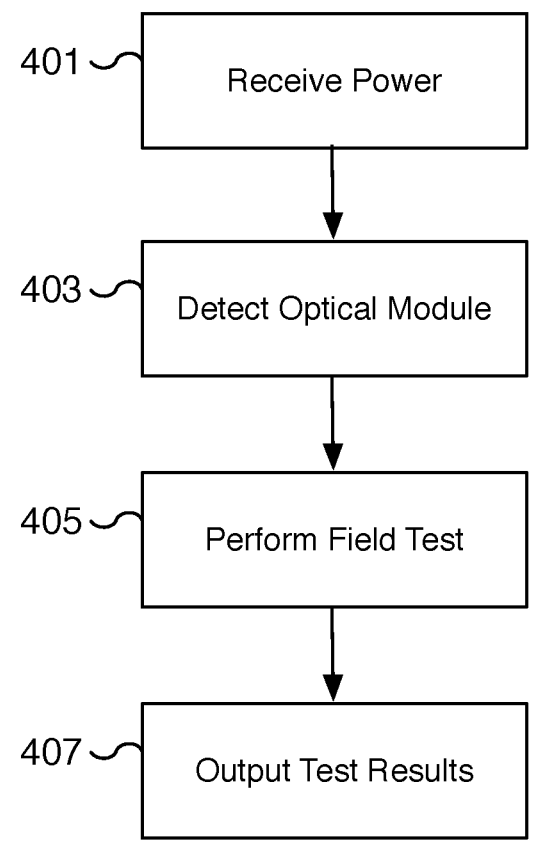
FIG. 4 is a flow diagram illustrating an embodiment of a process for the operation of a high-speed optical transceiver field reader.

FIG. 4 is a flow diagram illustrating an embodiment of a process for the operation of a high-speed optical transceiver field reader. In some embodiments, the process of FIG. 4 is implemented using field reader 101 of FIG. 1 and/or field reader 200 of FIG. 2. The process of FIG. 4 may be utilized to test the functionality and/or retrieve operational information of an optical module such as a QSFP optical transceiver used for data communications. In some embodiments, the process of FIG. 4 may be used to read diagnostics information from an optical module, such as the serial number and/or vendor information of an optical transceiver. In some scenarios, a network error may be difficult to isolate. In order to identify the faulty network element, each network element is tested in turn to determine which element is at fault. Using the process of FIG. 4, an optical transceiver may be determined to be functional or faulty.

In the example shown, at 401, power is received by the field reader. In various embodiments, the power is sourced from a portable power supply. In some embodiments, the power may be sourced from a Power over Ethernet device, a USB or similar port with power, or one or more ports of a network switch. In some embodiments, the power is sourced from the existing network infrastructure such that the field reader can be operated in the field. In some embodiments, the power is sourced from the battery of a mobile device or a portable battery supply. In some embodiments, the power is sourced from an AC-DC power supply. In some embodiments, the power is received at power interface 209 of FIG. 2.

At 403, an optical module is detected. For example, an optical module is detected after it is inserted into the field reader. In some embodiments, after an optical module such as an optical transceiver is inserted into the field reader, the field reader establishes a connection with the optical module. The network connection may utilize a network standard such as QSFP, QSFP+, QSFP28, or other similar standard as appropriate. In some embodiments, the connection between the field reader and the optical module is established using Tx Rx interface 203 of FIG. 2.

In some embodiments, the detection of an optical module at 403 is initiated by a hardware user interface. For example, a network operator presses a hardware button on the field reader to initiate the detection of an inserted optical module. In some embodiments, the detection is initiated by a remote GUI device such as GUI device 105 of FIG. 1. In some embodiments, the detection of the optical module includes configuring the field reader for performing a field test. In various embodiments, a GUI device may be utilized to configure the field test to be performed at step 405. For example, a GUI device may be used to configure the information and/or parameters to retrieve from the optical module and the optical module's electrically erasable programmable read-only memory (EEPROM).

At 405, a field test is performed. For example, an optical module is tested in the field, such as in a data center, using the field reader without requiring the module to be transported back to a testing lab. In some embodiments, the field test determines whether the optical module is functioning properly and conveys the result as a pass/fail result. In various embodiments, the field test includes retrieving additional information, such as diagnostics information, related to the transmission and reception of data using the optical module as well as information related to the specific optical module. In various embodiments, a loopback device, such as loopback device 109 of FIG. 1, is inserted into the optical module's transmitter and receiver ports prior to performing the field test.

In some embodiments, the test performed includes measuring the quality and bit-error ratio of a signal sent to and received from the optical module. In some embodiments, the field reader compares one or more binary signals transmitted to and received from the optical module to determine whether the optical module is functioning properly. In some embodiments, the field test performed includes reading one or more of a transmit (Tx) power readout, a receive (Rx) power readout, a power current readout, a bias current readout, a temperature, a bit-error ratio, electrically erasable programmable read-only memory (EEPROM) data corresponding to the optical module plugged into the field reader, and/or other appropriate information of the optical module.

In some embodiments, the inter-integrated circuit ($I^2C$) communication protocol is utilized to read information from the electrically erasable programmable read-only memory (EEPROM) of the optical module. In some embodiments, the field reader utilizes the full-rate FC communication protocol to access information from the optical module. The EEPROM data may include information on the module including supplier, version, power, serial number, and/or vendor information. In some embodiments, the field test performed at 405 is a diagnostic field test.

At 407, the test results from the field test performed at 405 are outputted. For example, the analysis from the field test of the optical module may be a pass or a fail result, which is displayed on the field reader for the network operator. In some embodiments, the test result(s) are displayed using test indicator 211 of FIG. 2. In some embodiments, the test result(s) are displayed using a set of light-emitting diodes (LEDs), a display such as a light-emitting diode (LED) or organic light-emitting diode (OLED) display, or other appropriate test indicator. In some embodiments, the output of the test results are sent to a graphical user interface device such as GUI device 105 of FIG. 1 for display. For example, a mobile device such as a smartphone or a laptop may function as a remote user interface for displaying and collecting test results. Based on the test results, the network operator may choose to place the optical module back into operation (e.g., in the event the optical module passes all tests) or to replace the faulty module with a working module (e.g., in the event the optical module fails any test).

In some embodiments, the output test results may include retrieving one or more of a transmit (Tx) power readout, a receive (Rx) power readout, a power current readout, a bias current readout, a temperature, a bit-error ratio, electrically erasable programmable read-only memory (EEPROM) data corresponding to the optical module plugged into the field reader, and/or other appropriate information of the optical module. In various embodiments, the process of FIG. 4 from start to finish can be completed in less than two minutes for each optical module. The testing process allows a network operator to quickly test multiple optical modules in the field.

In various embodiments, the output test results may be stored or logged to a storage system including remote storage. For example, the output test results may be stored in or by a GUI device. In some embodiments, the results are logged to a database and associated with an identification of the optical module tested and/or the time of the testing.

Figure 5:
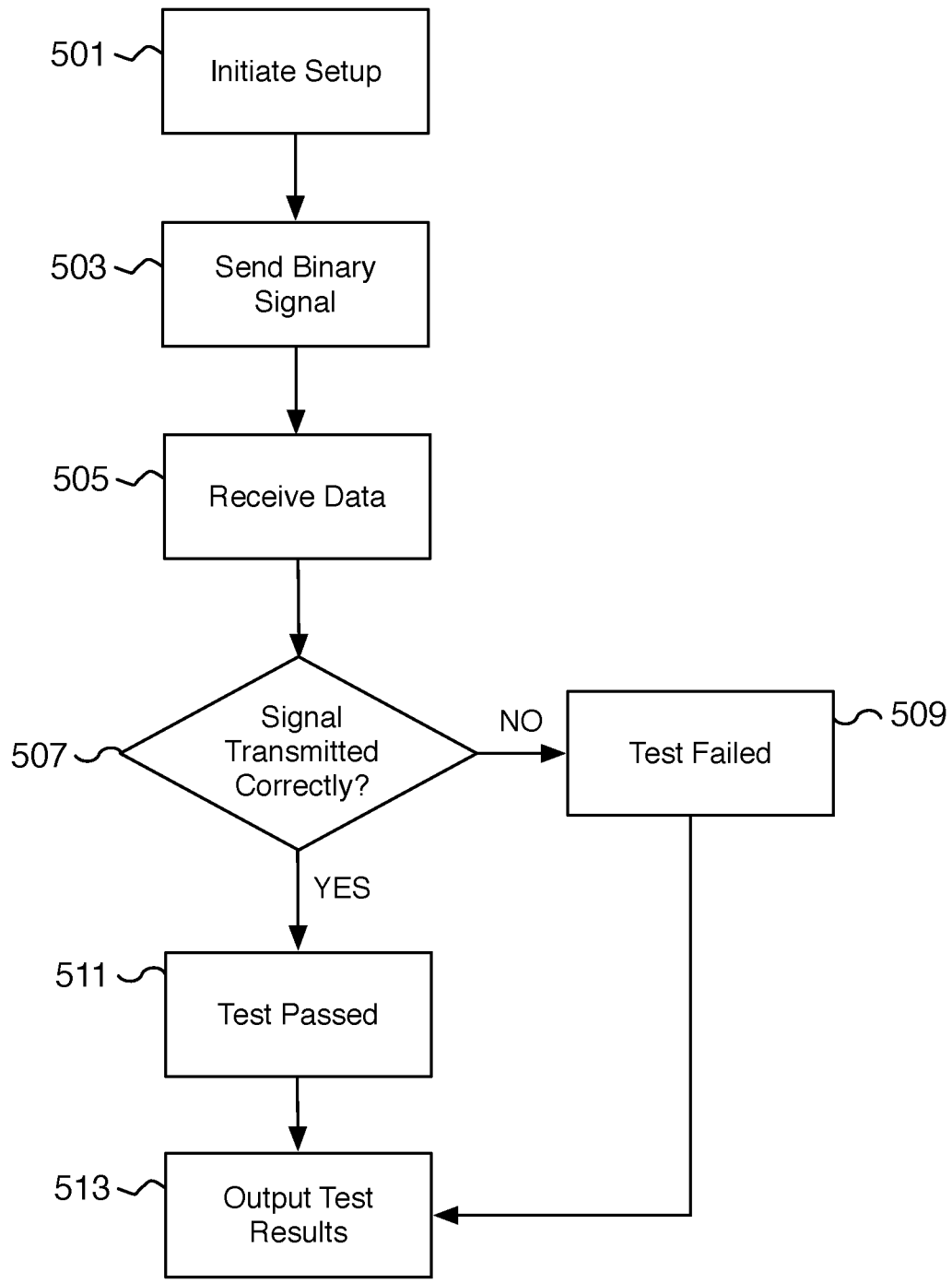
FIG. 5 is a flow diagram illustrating an embodiment of a process for the operation of a high-speed optical transceiver field reader to determine a pass/fail result.

FIG. 5 is a flow diagram illustrating an embodiment of a process for the operation of a high-speed optical transceiver field reader to determine a pass/fail result. In some embodiments, the process of FIG. 5 is used to determine whether an optical module is the source of a network fault. In various embodiments, the process of FIG. 5 results is a pass/fail result that may be utilized by a network operator to quickly determine whether an optical module is operating correctly or is a candidate for replacement. In some embodiments, the process of FIG. 5 is performed as part of steps 403, 405, and 407 of FIG. 4.

At 501, the field reader initiates a setup process. For example, once the field reader receives power it may enter a setup steady-state awaiting for an optical module with a loopback device installed to be inserted for testing. In the event an optical module is inserted and a field test is initiated, the setup proceeds to initiate the sending of a binary signal to the optical module. In various embodiments, the setup process may be performed by an onboard processor of the field reader. In some embodiments, the setup process is initiated via a user interface such as a hardware user interface or a GUI device.

At 503, a binary signal is sent from the field reader, using a transmitter, to the optical module inserted into the field reader. In various embodiments, the binary signal is generated using a pseudorandom binary sequence generator. For example, a pseudorandom binary sequence (PRBS) may be used as a binary signal and sent by the field reader to the optical module being tested. A pseudorandom binary sequence may be utilized to mimic real world traffic without requiring actual data or sample data. In some embodiments, utilizing a PRBS signal generator minimizes the memory, cost, and/or power requirements of the field reader. In some embodiments, the binary signal sent at 503 utilizes signal generator 205 and Tx Rx interface 203 of FIG. 2.

At 505, data is received by a receiver of the field reader from the optical module plugged into the field reader. In some embodiments, the data is received in response to the binary signal sent at 503 to the optical module. For example, the received data may be used to test the optical module based in part on whether the signal transmitted at 503 is accurately transmitted and received. In some embodiments, the data includes information from the optical module electrically erasable programmable read-only memory (EEPROM) such as the supplier, version, power, serial number, and/or vendor information of the optical module. In various embodiments, the field reader may utilize the full-rate inter-integrated circuit (I²C) communication protocol to access and receive information data from the optical module. In some embodiments, the data is received by the field reader via Tx Rx interface 203 of FIG. 2.

At 507, the field reader device determines whether the signal sent at 503 and received at 505 is transmitted correctly. For example, the signal sent at 503 is transmitted via the optical module and a corresponding signal is received from the optical module in response to the signal sent. In some scenarios, an optical module with a faulty optical transmitter may cause the signal sent by the field reader at 503 to be incorrectly propagated. Similarly, in some scenarios, an optical module with a faulty optical receiver may cause a correctly propagated signal by the optical module to not be correctly received by the optical receiver of the optical module. In various embodiments, the data received at 505 is analyzed and compared to the signal sent at 503 to determine whether the signal was correctly transmitted and whether the optical module is operating correctly. In some embodiments, the data is analyzed by error detector 207 of FIG. 2. For example, the analysis may include measuring the quality and bit-error ratio of the sent signal and/or received data. In some embodiments, the error detector of the field reader utilizes a processor to perform the analysis. For example, the error detector utilizes a processor to compare the binary signal transmitted to the signal data received to determine whether the optical module is functioning properly. In some embodiments, the analysis includes eye measurement tests to determine whether the optical transmitter and/or receiver of the optical module are functioning within a working specification. In some embodiments, the analysis of whether the signal is transmitted correctly is based in part on a transmit (Tx) power, a receive (Rx) power, a power current readout, a bias current readout, a bit-error ratio, and/or a temperature reading. In some embodiments, the determination is made on whether the signal was transmitted and received correctly by utilizing Tx Rx interface 203 and error detector 207 of FIG. 2.

In the event at 507 the signal was not transmitted correctly, at 509, a determination is made that the test failed. For example, in the event the optical module did not correctly transmit the signal sent at 503 and received at 505, a determination is made at 509 that the optical module is not operating correctly and has failed the field test.

In the event at 507 the signal was transmitted correctly, at 511, a determination is made that the test passed. For example, in the event the optical module correctly transmits the signal sent at 503 and received at 505, a determination is made at 511 that the optical module is operating correctly and has passed the field test.

At 513, the results associated with the test passing at 511 or alternatively the test failing at 509 are outputted. In some embodiments, the output is displayed using test indicator 211 of FIG. 2. In various embodiments, the output may be displayed using GUI device 105 of FIG. 1. The output test results displayed at 513 may include displaying one or more of the following: a pass/fail result, a transmit (Tx) power readout, a receive (Rx) power readout, a power current readout, a bias current readout, a bit-error ratio, and electrically erasable programmable read-only memory (EEPROM) information of the optical module tested. In various embodiments, outputting the test results may include storing or logging the results for later review.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
an interface configured to connect to an electrical connector of an optical network transceiver;
a transmitter configured to send to the optical network transceiver via the interface connected to the electrical connector of the optical network transceiver a binary signal generated by the device, wherein the binary signal includes a plurality of different component signals generated by the device for different channels of the optical network transceiver and the binary signal provided by the transmitter is transmitted by the optical network transceiver via a first optical port of the optical network transceiver and received at a second optical port of the optical network transceiver;
a receiver configured to receive data that traveled between the first optical port and the second optical port and provided by the optical network transceiver via the same interface connected to the same electrical connector of the optical network transceiver, in response to sending the generated binary signal;
a processor configured to analyze the received data; and
a dynamically updating indicator on the device, wherein the dynamically updating indicator is configured to indicate a test status of the optical network transceiver.

2. The device of claim 1, wherein the optical network transceiver utilizes a four optical channel pluggable interface.

3. The device of claim 2, wherein each channel of the four optical channel pluggable interface supports a plurality of rates, including rates 28 gigabits per second and 100 gigabits per second.

4. The device of claim 1, wherein the generated binary signal includes a pseudorandom binary signal.

5. The device of claim 1, wherein the generated binary signal is generated using a quad pseudorandom binary signal generator.

6. The device of claim 1, wherein the processor configured to analyze the received data utilizes a quad-channel error detector.

7. The device of claim 1, wherein the optical network transceiver is attached to an optical loopback device.

8. The device of claim 7, wherein the optical loopback device routes an optical signal from a transmitter port of the optical network transceiver back to a receiver port of the optical network transceiver.

9. The device of claim 1, wherein the device is configured using a wireless graphical user interface device.

10. The device of claim 9, wherein the wireless graphical user interface device includes a smartphone in communication with the device using a wireless protocol.

11. The device of claim 1, wherein the device is at least in part powered via a connection to a network switch.

12. The device of claim 11, wherein the connection to the network switch is via a Power over Ethernet port.

13. The device of claim 1, wherein the test status includes a transmit power readout, a receive power readout, a power current readout, a bias current readout, a temperature, a bit-error ratio, or an electrically erasable programmable read-only memory (EEPROM) data corresponding to the optical network transceiver.

14. The device of claim 1, wherein the device utilizes a full-rate inter-integrated circuit (I2C) communication protocol for retrieving information from an electrically erasable programmable read-only memory (EEPROM) of the optical network transceiver.

15. The device of claim 1, further comprising a high quality reference clock.

16. The device of claim 1, wherein the device is connected to an external programmed computer system.

17. The device of claim 1, wherein the test status of the optical network transceiver includes a supplier, a version number, a serial number, or a vendor information retrieved from an electrically erasable programmable read-only memory (EEPROM) of the optical network transceiver.

18. A device, comprising:
an attachable optical loopback device;
an interface configured to connect to an electrical connector of an optical network transceiver;
a transmitter configured to send to the optical network transceiver via the interface connected to the electrical connector of the optical network transceiver a binary signal generated by the device, wherein the binary signal includes a plurality of different component signals generated by the device for different channels of the optical network transceiver and the binary signal provided by the transmitter is transmitted by the optical network transceiver via a first optical port of the optical network transceiver and received at a second optical port of the optical network transceiver;
a receiver configured to receive data that traveled between the first optical port and the second optical port and provided by the optical network transceiver via the same interface connected to the same electrical connector of the optical network transceiver, in response to sending the generated binary signal;
a processor configured to analyze received data provided by the optical network transceiver in response to sending a generated binary signal to the optical network transceiver; and
a dynamically updating indicator on the device, wherein the dynamically updating indicator is configured to indicate a test status of the optical network transceiver.

19. A method, comprising:
connecting an optical network transceiver to a field reader device; and
using the field reader device to perform a field test on the optical network transceiver, wherein the field reader device comprises:
an interface configured to connect to an electrical connector of the optical network transceiver;
a transmitter configured to send to the optical network transceiver via the interface connected to the electrical connector of the optical network transceiver a binary signal generated by the field reader device, wherein the binary signal includes a plurality of different component signals generated by the field reader device for different channels of the optical network transceiver and the binary signal provided by the transmitter is transmitted by the optical network transceiver via a first optical port of the optical network transceiver and received at a second optical port of the optical network transceiver;
a receiver configured to receive data that traveled between the first optical port and the second optical port and provided by the optical network transceiver via the same interface connected to the same electrical connector of the optical network transceiver, in response to sending the generated binary signal;
a processor configured to analyze the received data; and
a dynamically updating indicator on the field reader device, wherein the dynamically updating indicator is configured to indicate a test status of the optical network transceiver.

20. The method of claim 19, further comprising using a loopback connector to connect an optical transmitter of the optical network transceiver with an optical receiver of the optical network transceiver.

* * * * *